United States Patent [19]

Ragaly

[11] Patent Number: 4,894,574
[45] Date of Patent: Jan. 16, 1990

[54] STATOR SUPPORT FOR ELECTRIC MACHINE

[75] Inventor: Istvan Ragaly, Schwieberdingen, Fed. Rep. of Germany

[73] Assignee: Robert Bosch GmbH, Stuttgart, Fed. Rep. of Germany

[21] Appl. No.: 86,699
[22] PCT Filed: Aug. 13, 1986
[86] PCT No.: PCT/DE86/00326
  § 371 Date: Jul. 1, 1987
  § 102(e) Date: Jul. 1, 1987
[87] PCT Pub. No.: WO87/03147
  PCT Pub. Date: May 21, 1987

[30] Foreign Application Priority Data

Nov. 6, 1985 [DE] Fed. Rep. of Germany ....... 3539298

[51] Int. Cl.$^4$ ............................................. H02K 1/12
[52] U.S. Cl. ..................................... 310/258; 310/42; 310/51; 310/91
[58] Field of Search .................. 310/42, 254, 258, 89, 310/91, 217, 218, 51, 43; 336/210, 212, 216

[56] References Cited

U.S. PATENT DOCUMENTS

| | | |
|---|---|---|
| 1,801,124 | 4/1931 | Teighmann . |
| 1,852,829 | 4/1932 | Welch . |
| 2,154,146 | 4/1939 | Becker . |
| 2,523,520 | 9/1950 | Reinhard ............................ 310/258 |
| 2,653,257 | 9/1953 | Sailer .................................... 310/42 |
| 2,953,697 | 9/1960 | Wall ...................................... 310/51 |
| 4,469,973 | 9/1984 | Guyot ................................. 310/258 |
| 4,506,180 | 3/1985 | Shizuka ................................ 310/45 |

FOREIGN PATENT DOCUMENTS

| | | |
|---|---|---|
| 0406875 | 12/1924 | Fed. Rep. of Germany ...... 310/258 |
| 0608371 | 1/1935 | Fed. Rep. of Germany . |
| 0713820 | 11/1941 | Fed. Rep. of Germany . |
| 2203014 | 7/1973 | Fed. Rep. of Germany ........ 310/89 |
| 2817532 | 6/1979 | Fed. Rep. of Germany . |
| 0950837 | 10/1949 | France ................................. 310/217 |
| 0115612 | 10/1976 | Japan . |
| 0413771 | 7/1934 | United Kingdom . |
| 0695415 | 8/1953 | United Kingdom ................ 310/258 |
| 1218003 | 1/1971 | United Kingdom ................ 310/258 |
| 1395212 | 6/1971 | United Kingdom .................. 310/89 |
| 2029120 | 3/1980 | United Kingdom . |

Primary Examiner—R. Skudy
Attorney, Agent, or Firm—Michael J. Striker

[57] ABSTRACT

In a threephase generator, it is suggested, for the purpose of supporting the stator plates, to provide the latter with a decoupling ring which is held securely at the stator plates on the one hand and, on the other hand, by means of clamping in a fit of the housing parts of the threephase generator on both sides. The decoupling ring can consist of two decoupling ring portions which embrace the stator plates and, at a distance from the latter, form a common clamping place for the end shields of the housing; or a radial ring can be formed, which is securely connected along the circumference alternately with the surface of the stator plates on the one hand, and, on the other hand, with certain clamping places in the housing by means of coupling segments. The half-shells of the decoupling ring and the radial ring can be formed directly by the laminations of the stator plates by means of a corresponding shaping.

22 Claims, 4 Drawing Sheets

STATOR SUPPORT FOR ELECTRIC MACHINE

BACKGROUND OF THE INVENTION

The invention relates to a device for supporting a stator of an electric machine.

From FIG. 1, which shows a known embodiment form of the arrangement of the stator plates in a threephase generator between the two adjacent housing parts, it can be seen that the plates forming the stator are clamped and simultaneously centered in fitted boreholes of the A end shield 12 on the ventilator side and the B end shield 13 on the slip ring side, wherein the individual stator laminations 10 are held together by means of suitable rivet connections 11, for example, so as to be distributed along the circumference of the stator yoke. A disadvantage in such a known stator fastening is the coupling of the stator with the adjacent annular walls of the housing, this coupling being dynamically rigid, as a result of which the radiation surface responsible for noise generation in a threephase generator is considerably enlarged and, moreover, the self-resonant frequencies of the generator parts (stator, end shields) can be shifted under certain circumstances into particularly troublesome frequency ranges. In addition, in the known stator fastenings between the end shields 12 and 13 there is the possibility that a deformation of the stator will occur because of the assembly of the two housing parts and that the stator borehole 14 will possibly lose its roundness.

SUMMARY OF THE INVENTION

Therefore, the invention has the object of providing fastening possibilities for the stator in an electric machine, preferably in a threephase generator provided for the operation of motor vehicles, in which the stator is held in the housing securely and centrically with low noise generation.

In keeping with these objects and with other which will become apparent hereinafter, the device comprises an intermediate ring which is arranged radially outwardly of the outer annular surface of the stator yoke between the stator yoke and the housing parts, means for clamping the intermediate ring between the housing parts of the housing, and means for connecting the intermediate ring with the stator yoke has the advantage that the centric mounting of the stator in the housing of the threephase generator is substantially facilitated and a deformation of the inner borehole of the stator can be prevented to a great extent. In addition, it is particularly advantageous that the stator vibrations are not transmitted directly to the generator housing but, rather, via decoupling rings or sectors, so that a reduction of the noise radiated in the radial direction by the stator and the housing is achieved.

There are several advantages developements and improvements of the device. In a first embodiment form, it is particularly advantageous that stator surfaces are completely shielded externally by means of the arrangement of a decoupling ring which supports the stator yoke, wherein, in addition, the cylindrical annular surface of the stator is held at a predetermined distance relative to the decoupling ring; this spacing has a damping effect, and a sealing or damping substance, which additionally reinforces the damping effect, can be introduced in this spacing.

In another embodiment example of the invention, radial portions of the outer wall of the stator yoke are also held at a distance relative to a shielding decoupling ring, at least along predetermined circumferential angles, wherein the decoupling ring can be entirely dispensed with when the stator plates forming the stator yoke are preprocessed, that is, punched out, in such a way that a decoupling ring effect results in connection with a special housing shape.

BRIEF DESCRIPTION OF THE DRAWINGS

Embodiment examples of the invention are shown in the drawing and are explained in more detail in the following description.

FIG. 4 shows the sectional construction of a decoupling ring portion in the deformed state, while

DESCRIPTION OF THE EMBODIMENT EXAMPLES

Figure 1:
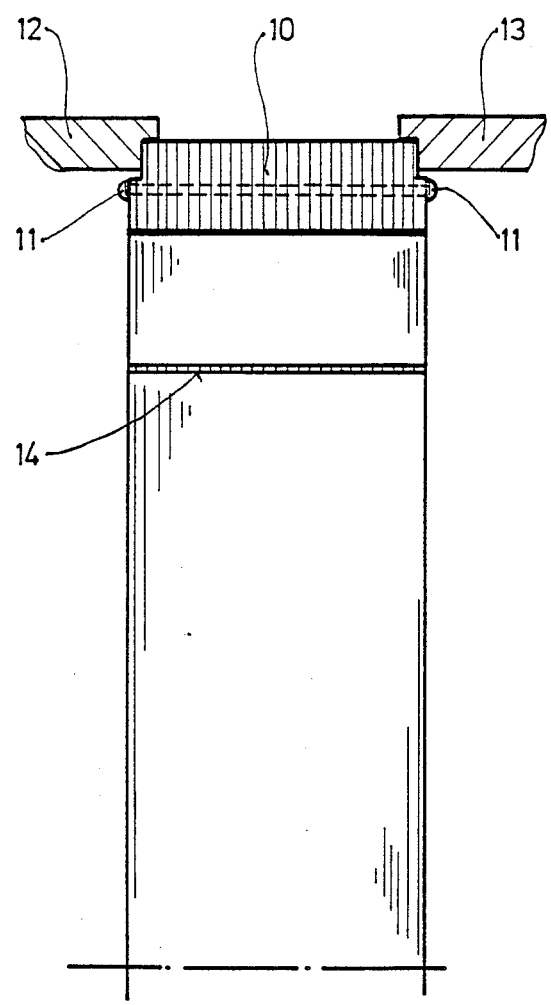
FIG. 1 shows a considerably schematized presentation of a conventional support and clamping possibility for the stator yoke between the end shield, which abuts on both sides, and the end shield of the housing of a threephase generator, in section.

The known clamping of the stator yoke between two adjacent end shields 12 and 13 of a threephase generator shown in FIG. 1 need not be discussed further; the stator yoke is formed from individual iron plates in an appropriate shaping and rests in the stator plate mold in a suitable fit of the housing parts which contact on both sides, the stator plate mold being held together by means of a rivet connection 11.

Figure 2:
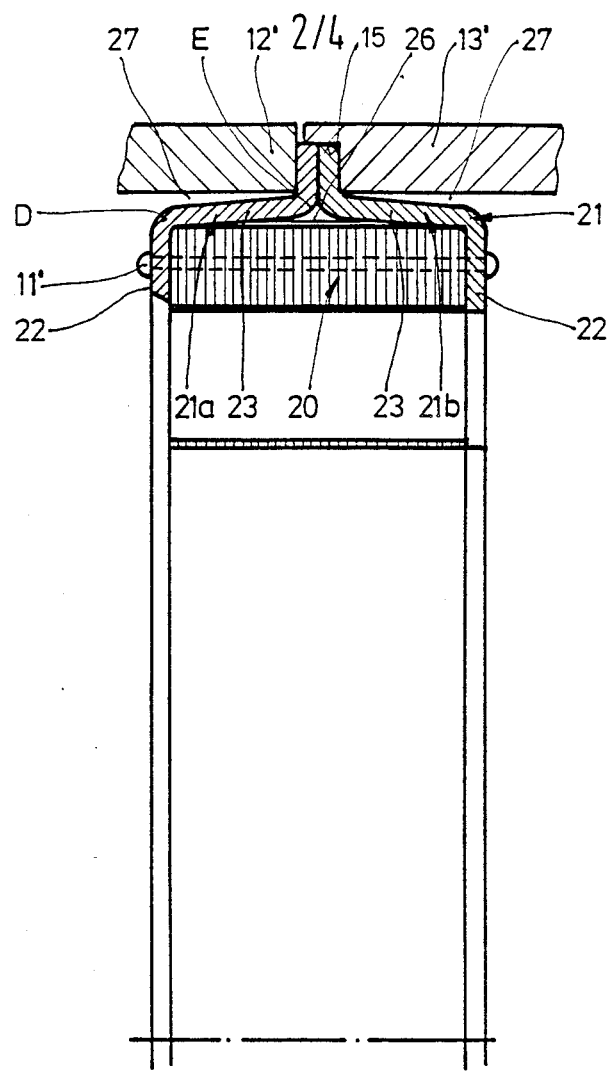
FIG. 2 shows a first embodiment example of the invention, shown schematically in section, in which the stator plates are supported by a decoupling ring which is assembled to form an annular shell.

In the first embodiment form of a device for supporting the stator, according to the invention, which is shown in FIG. 2, the stator yoke 20 which has an axis and an outer annular surface is held at and within the threephase generator housing in that a bearing or intermediate decoupling ring 21, which is fastened at the stator yoke in a suitable manner on the one hand and is held centrically in the housing of the threephase generator, for example, by means of insertion in a fitted borehole 15 of the end shield 13', on the other hand, is arranged between the housing parts 12' and 13' and the stator yoke 20. The housing parts 12' and 13' are adjacent on both sides and can be formed as end shields. The supporting decoupling ring construction, which is designated in the following as decoupling ring, is formed from two decoupling half-rings, each of which is constructed per se as a half shell and comprises an approximately flat S-shape, as shown in a cross-sectional presentation in FIG. 4.

The decoupling ring 21, which is formed from the two half-ring-shaped decoupling ring portions 21a, 21b, therefore encloses the stator yoke 20 radially from the outside in a continuous manner and also embraces it laterally, that is, with the two legs 22, which are drawn down laterally, at least at the axial outer annular surfaces to the extent that a secure fastening is possible at the entire stator plate bundle, preferably by means of rivet connections 11' which are guided through the stator plates and the adjacent legs of the decoupling ring portions 21a, 21b.

It can be seen clearly from FIG. 2 that the two partial ring surfaces 23 of each decoupling ring portion, which are directed toward one another, extend at a comparatively very acute angle relative to the outer annular surface of the stator yoke 20 in such a way that there is a spacing of approximately 0.05 mm to 0.1 mm, possibly even larger, in the center of the stator. This spacing effects a decoupling of the stator which is already effective in itself, the stator being securely held by the housing parts of the threephase generator on both sides by means of the clamping of the decoupling ring 21 along its entire circumference; wherein the clamping and fastening of the decoupling ring 21 at the housing parts on both sides is effected in such a way that a raised annular flange 24 of each decoupling ring portion 21a, 21b proceeds from the substantially axially extending partial ring surfaces 23, the decoupling ring portions 21a, 21b being held in the fitted borehole 15 so as to be pressed together by the two housing parts. These two annular flanges 24, which are shown in the sectional presentation of FIG. 4 as upwardly extending partial legs, simultaneously center the stator plates by means of their clamping in a manner which will be described in the following.

Figure 3:
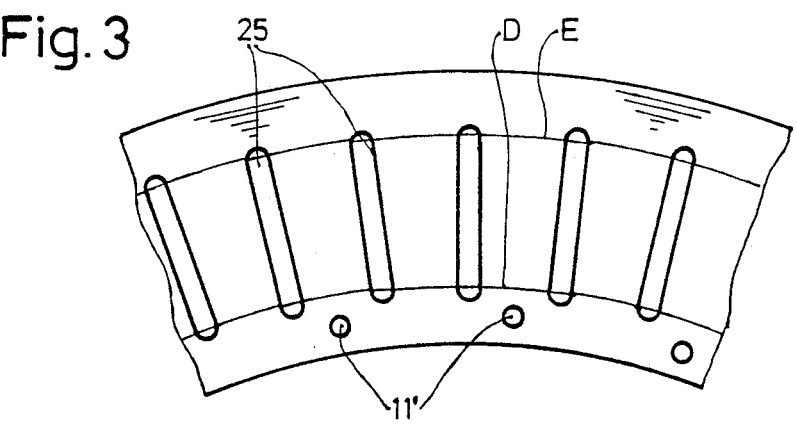
FIG. 3 shows the basic form of the decoupling ring prior to flexural shaping.

Each decoupling ring portion can be constructed so as to be continuously holohedral or can comprise longitudinal openings which are punched out and extend in the axial direction and are designated by 25 in FIG. 3. FIG. 3 shows a preform or the blank for the production of each decoupling ring portion prior to the flexion or deformation process, wherein the respective bending edges are designated by D and E in FIG. 3. FIG. 3 also shows the boreholes for the production of the rivet connections 11'.

A decoupling is successfully achieved in the area of the stator to a great extent by means of the selection of material, thickness and quantity and the ratios of the widths of the punched out longitudinal openings, as well as of the decoupling ring portions. By means of the partial (half) ring surfaces 23, which extend at slightly acute angles, that is, at a slight inclination, a hollow space 26, which is interior in this case, is achieved relative to the outer annular surface of the inner stator yoke, as well as spacing intervals 27 on both sides relative to the housing walls, thereby resulting in a reliable vibration resistance. The punched out longitudinal grooves 25 act as an additional cross-sectional enlargement for the ventilation.

Figure 4:
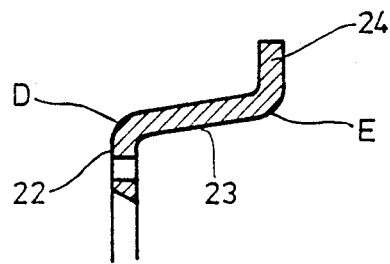

In order to achieve a perfect, and to this extent also simplified, centering of the stator borehole, one may proceed as follows in connection with the support of the stator by means of decoupling ring portions: according to its own shaping in the first instance, that is, bending in the desired construction of FIG. 4 and fastening (riveting) at the stator, the decoupling ring portions are punched out centrically in the outer circumference in a highly precise manner in that the stator borehole is centered by means of a spike or spindle and the outer diameter of the decoupling ring portions 21a, 21b is punched out accurately and, above all, centrically. The decoupling ring is then installed with a tight sliding fit in the centrally situated housing fitted borehole 15, and it can be seen that the stator can no longer be deformed because of this assembly of the two housing parts 12', 13', since the assembly acts exclusively on the outer annular flanges 24 of the decoupling ring 21 and clamps them and no longer acts on the stator itself. The round stator borehole is also ensured by means of this; accordingly, it is not necessary to process the contact surfaces of the decoupling ring portions for the housing fastening.

Finally, an advantageous construction of this embodiment form of the support of the stator plates by means of a decoupling ring consists in that the end plates of the stator yoke are correspondingly constructed as the decoupling ring portions on both sides as shown in FIG. 2 by the leg 22 at the right in the drawing plane. The plate 28. Each such leg 22 performs a two-fold function, simultaneously forming a decoupling ring portion and a stator end plate. This results in a corresponding reduction of weight.

Figure 5:
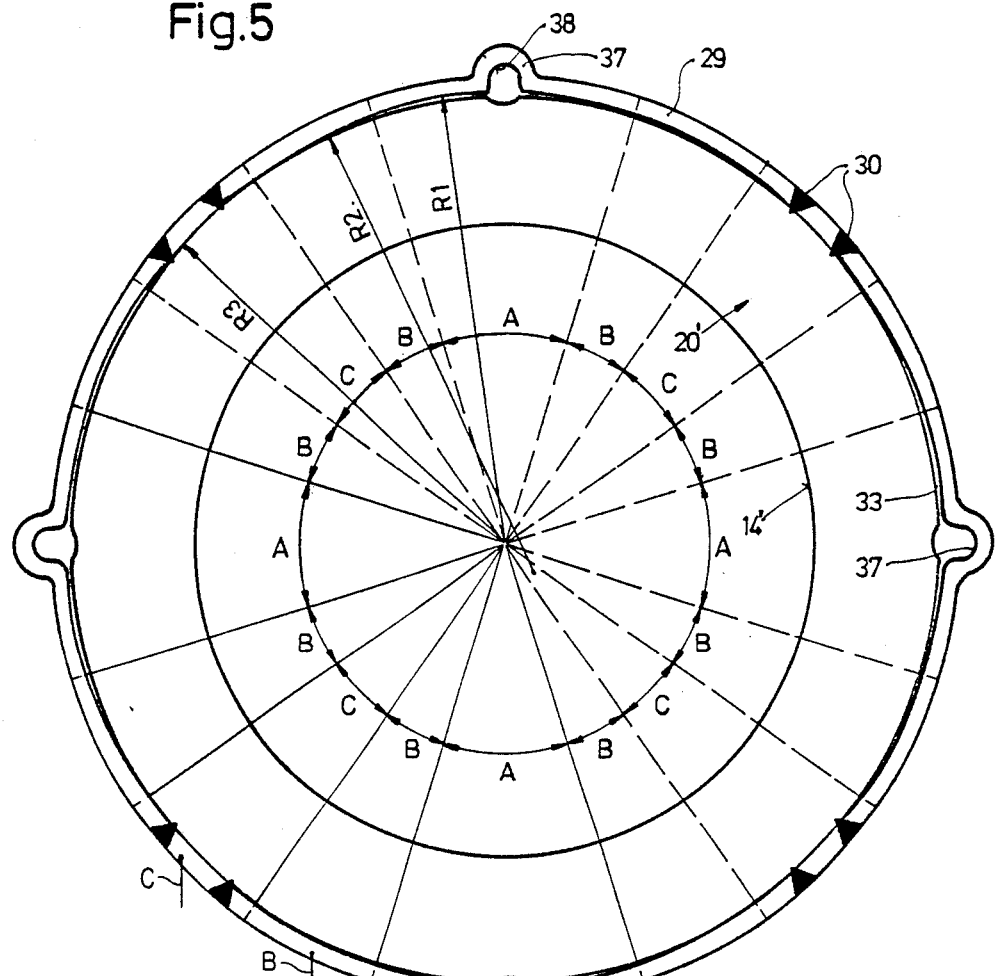
FIG. 5 shows another embodiment example for the stator support by means of a radial decoupling ring divided into angular sectors.
Figure 6:
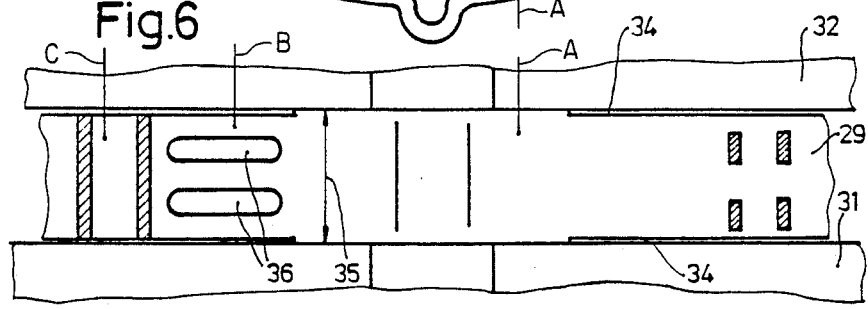
FIG. 6 shows the developed view or top view of the radial decoupling ring with housing walls indicated on both sides, as seen from below or from the top; finally.
Figure 7:
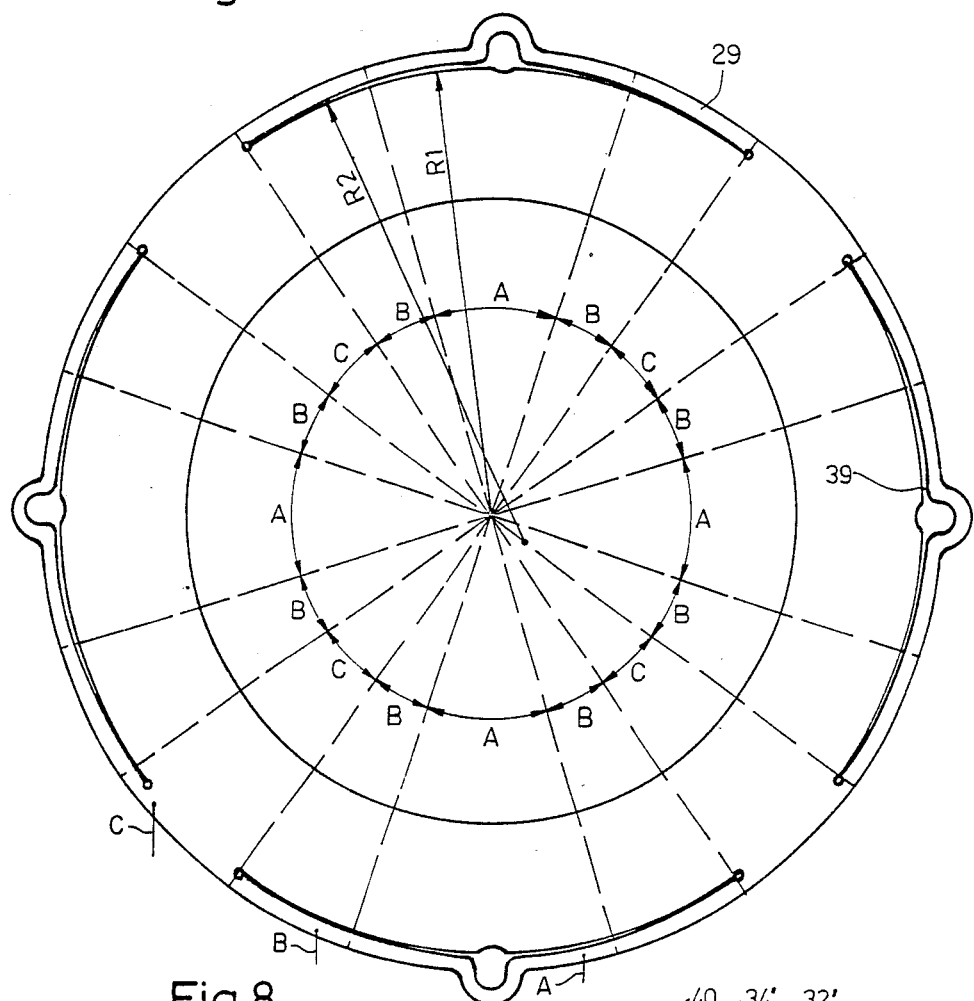
FIGS. 7 and 8 show another construction of the solution shown in FIGS. 2 and 6, in which the radial decoupling ring itself is formed directly by means of correspondingly punched out and preprocessed stator plates.
Figure 8:
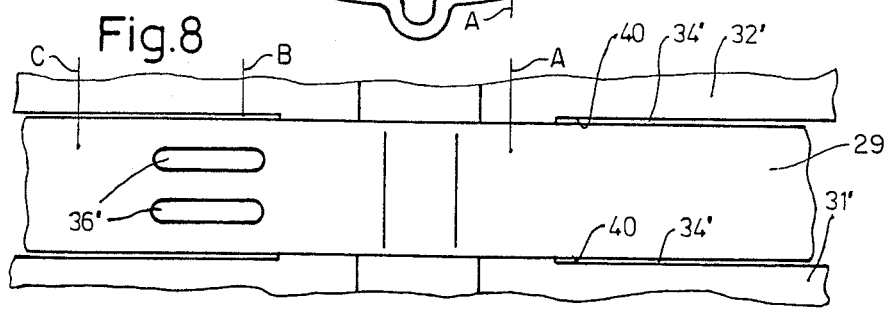

In another embodiment example of the present invention, which is shown in FIGS. 5 and 6 and, in a modified manner, in FIGS. 7 and 8, the decoupling ring is a radial ring 29 which rests on the outer annular surface of the stator yoke 20', that is, it rests on the annular stator yoke in the manner of the treads of a wheel or a barrel ring. The stator borehole is designated by 14', and the fastening of the radial ring 29 at the outer surface of the stator yoke 20' is effected—and this is a substantial characteristic feature of the present embodiment form—not along the entire circumference but, rather, only in certain predetermined sectors which are designated by C, in each instance, in FIG. 5. At these places, the respective segment area, which is designated in the following as fixed segment C, is rigidly connected with the stator yoke, specifically within the area which is overlapped by the opening angle of the fixed segment C, for example, by means of suitable welding seams or spot welding, as indicated at 30.

The radial ring 29 is divided into additional segments in alternating sequence, that is, so-called transitional or coupling segments B which are arranged at both sides of each fixed segment C, the latter naturally passing into the transitional or coupling segments B so as to form one piece; segments, which preferably have a greater angular opening and which serve to clamp and centrically fasten the stator yoke 20' at the housing parts of the end shield 31 or end shield 32 on both sides and which are designated in the following as clamping segments A, adjoin the transitional or coupling segments B at both sides. The segments or sectors are distributed along the circumference of the radial ring 29 in such a way that, in the embodiment example of FIG. 5, for example, there are four clamping segments A arranged at uniform angles at a distance from one another and there are coupling segments B which adjoin each clamping segment on both sides and which pass into a fastening segment C again in each instance. Another characteristic feature pertaining to this distribution in sectors or segments consists in that there is a slot spacing or an additional gap 33 relative to the outer surface of the stator in the arc-shaped course from one fastening segment C to the other fastening segment, which slot spacing 33 widens toward the center of the respective clamping segment A and then is reduced again, so that three different radii R1, R2 and R3 are formed, wherein radius R3 is the smallest radius and corresponds to the outer radius of the stator yoke, while radius R2 is the transitional radius for the coupling segment B, and radius R1 indicates the largest spacing of radial rings 29 relative to the outer surface of the stator yoke. This spacing can also be between 0.1 mm and 0.05 mm and results in accordance with the dimensioning, also on the basis of empirical radiation and noise data.

The stator yoke 20', which is provided with such a radial ring 29, is fastened at the end shields of the three-phase generator housing on both sides in that, as an additional characteristic feature, the area of the respective clamping segment A is greater in width, that is, in its axial longitudinal extent, as seen with reference to the threephase generator as a whole, than the adjacent and continuing segments B and C by a predetermined spacing 34 on both sides, which spacing 34 is also only slight, so that it is possible to rigidly clamp the unity consisting of radial ring 29 and stator yoke 20' in the end shields 31 and 32 on both sides (see FIG. 6) in clamping segment A, while the housing, with its end shields 31 and 32 on both sides, is not supported in the coupling segment areas B and the fastening segments C. By means of this, a certain degree of decoupling results between the stator and the housing, which is chiefly determined by means of the rigidity of the radial ring material between the two segments A and C, respectively, wherein the segment A is securely connected with the housing and the segment C is securely connected with the stator. The degree of decoupling here can also be determined by means of material and thickness as well as the makeup of the radial ring, including the arrangement of possible punched out openings 36. The effective axial length of the clamping segment A is designated by 35 in FIG. 6.

Such a construction of a decoupling ring in the form of a radial ring shape prevents larger deflection amplitudes of the stator (<0.1 mm) in the radial direction by means of the effect of the rigidity of the housing. Finally, FIG. 5 shows bulges 37 which are distributed along the circumference of the radial ring 29 and which form through-openings 38 in the area of the clamping segments A. Clamping elements of a suitable type, which connect the two housing end shields 31 and 32 with one another, can be guided through these through-openings 38; the clamping elements then simultaneously also rigidly clamp the clamping segment A in each instance. Also, in addition to achieving a corresponding noise reduction by means of adhering to the principle of decoupling, such a principle of assembly facilitates the centric mounting of the stator, particularly since the stator borehole can also not be clamped in this instance so as to lose its roundness when clamping together, since the clamping means only act on the clamping segments A, but ensure a perfect centering of the stator borehole with reference to the end shields on both sides, which end shields, as is known, receive the roller bearings for the rotor shaft.

Finally, in the embodiment example of FIGS. 5 and 6 the possibility is provided that the stator plates themselves can assume the task of the decoupling ring construction as shown in FIGS. 7 and 8.

In this embodiment form, all plates forming the stator yoke are punched out and constructed along the outer circumference in the manner shown in a top view in FIG. 7, i.e., they are uniformly distributed along the circumference; slots 39—four of them in the embodiment example—are arranged in the stator plates, the slots 39 substantially imitate exactly the formation of spacing as shown in the radial annular construction in FIG. 5; fastening segments C are also arranged along the circumference in the same manner and, in this instance, form one piece with the plates of the stator, wherein the radial ring construction is recognizably formed only in the slot areas; transitional or coupling segments B adjoin the fastening segments at both sides and pass into the clamping segments A with a larger opening angle.

In order to ensure that a rigid clamping effectively takes place only along the area of the clamping segments B, it is preferable not to change the construction of the stator yoke with respect to the axial length, which would be impractical; rather, the desired spacing formation 34' relative to the free stator segments B and C is achieved by means of corresponding housing recesses 40 which adjoin the housing area in each instance and serve for the clamping of the clamping segments A. Here, also, slot openings 36', which extend in the circumferential direction, can be arranged in the decoupling ring construction, which is formed by the outer surface area of the plates themselves, by means of corresponding cut out portions.

Finally, corresponding to a construction of the present invention, it is possible to apply or introduce a suitable filling substance, such as a sealing or damping substance, for example, by means of pouring in, pressing, inserting, clamping, and the like, in all the inner hollow spaces or areas formed by means of the spacing of the respective decoupling ring construction relative to the stator yoke, that is, in the embodiment example of FIG. 2, in the space or gap 26 between the decoupling ring and the stator yoke or between the coupling segment B and the clamping segment A and the stator yoke surface (spacing or an additional gap 33) and/or between the fastening segment or fixed segment C and coupling segment B and the housing as identified in dots in FIGS. 2, 5 and 7. This substance ensures the continued decoupling of the stator plates from the housing, preferably protects against corrosion, and serves as a damping element for vibrations having large amplitudes. Silicon rubber, Viton or a similar suitable (plastics) material, for example, come under consideration as material for the sealing and damping substance.

All of the characteristic features shown in the description, in the following claims and in the drawing are substantial to the invention individually as well as in desired combination with one another.

I claim:

1. A device for supporting a stator of an electric machine, wherein the stator has a stator yoke with an axis and an outer annular surface and the electric machine has a housing with housing parts which have at least one borehole, the device comprising an intermediate ring which is arranged radially outwardly of the outer annular surface of the stator yoke between the stator yoke and the housing parts at a predetermined radial distance from the latter, said ring including two half-shell-shaped ring portions arranged to embrace the stator yoke at both axial sides and each including a lateral annular flange, an axially extending half-ring surface, and a vertical flange; means for clamping said intermediate ring between the housing parts of the housing, said vertical flanges of said half-shell-shaped ring portions abutting against one another and being clamped in the borehole so as to form said clamping means; and means connecting said intermediate ring with the stator yoke.

2. A device as defined in claim 1, wherein said connecting means being formed so that said ring is connected with the stator yoke only along predetermined angular distances and radial spacings are formed between the stator yoke and said ring.

3. A device as defined in claim 1, wherein said half-ring surfaces of said ring portions are formed so that they enclose an acute angle relative to the outer annular surface of the stator yoke and also relative to the housing parts.

4. A device as defined in claim 1, wherein said lateral annular flanges are formed so that they laterally embrace the stator yoke on its both axial sides, said connecting means includes rivet means which are distributed along a circumference of said lateral annular flanges and connect the latter with the stator yoke.

5. A device as defined in claim 1, wherein said ring portions are arranged centrally relative to the stator yoke.

6. A device as defined in claim 1, wherein each of said half-ring surfaces of said ring portions has a plurality of longitudinal openings formed relative to a remaining portion of each of said half-ring surfaces determine.

7. A device as defined in claim 1, wherein the stator yoke has a plurality of stator plates including stator end plates, said ring including two half-shell-shaped ring portions, one of said ring portions being formed at one of the stator end plates of the stator yoke.

8. A device as defined in claim 1, wherein the stator yoke forms a first element, said intermediate ring forms a second element, and said housing parts form a third element, said elements being arranged so that a gap is formed between at least two of said three elements; and further comprising filling means for filling said gap.

9. A device as defined in claim 8, wherein said filling means includes a sealing substance arranged in said gap between at least two of said elements.

10. A device as defined in claim 8, wherein said filling means includes a damping substance arranged in said gap between at least two of said elements.

11. A device as defined in claim 8, wherein an additional gap is formed between said two elements and the remaining one of said elements; and further comprising filling means for filling said additional gap.

12. An electric machine comprising a stator yoke having an outer annular surface; a housing including housing parts which have at least one borehole, and a device for supporting said stator, said device including an intermediate ring which is arranged radially outwardly of the outer annular surface of the stator yoke between the stator yoke and the housing parts at a predetermined radial distance from the latter, said ring including two half-shell-shaped ring portions arranged to embrace the stator yoke at both axial sides and each including a lateral annular flange, an axially extending half-ring surface, and a vertical flange; means for clamping said ring between the housing parts of the housing, said vertical flanges of said half-shell-shaped ring portions abutting against one another and being clamped in the borehole so as to form said clamping means; and means for connecting said ring with the stator yoke.

13. An electric machine as defined in claim 12, wherein said ring is connected with said stator yoke only along predetermined angular distances and radial spacings are formed between said stator yoke and said ring.

14. An electric machine as defined in claim 12, wherein said half-ring surfaces of said ring portions are formed so that they enclose an acute angle relative to said outer annular surface of said stator yoke and also relative to said housing parts.

15. An electric machine as defined in claim 12, wherein said lateral annular flanges are formed so that they laterally embrace said stator yoke on its both axial sides, said connecting means includes rivet means which are distributed along a circumference of said lateral annular flanges and connect said latter with said stator yoke.

16. An electric machine as defined in claim 12, wherein said ring portions are arranged centrally relative to said stator yoke.

17. An electric machine as defined in claim 12, wherein each of said half-ring surfaces of said ring portions has a plurality of longitudinal openings formed relative to a remaining portion of each of said half-ring surfaces.

18. An electric machine as defined in claim 12, wherein said stator yoke has a plurality of stator plates including stator end plates, said decoupling ring including two half-shell-shaped decoupling ring portions, one of said ring portions being formed at one of said stator end plates of said stator yoke.

19. An electric machine as defined in claim 12, wherein said stator yoke forms a first element, said intermediate ring forms a second element, and said housing parts form a third element, said elements being arranged so that a gap is formed between at least two of said three elements; and further comprising filling means for filling said gap.

20. An electric machine as defined in claim 19, wherein said filling means includes a sealing substance arranged in said gap between at least two of said elements.

21. An electric machine as defined in claim 19, wherein said filling means includes a damping substance arranged in said gap between at least two of said elements.

22. An electric machine as defined in claim 19, wherein an additional gap is formed between said at least two of said three elements and said remaining one of said three elements; and further comprising filling means for filling said additional gap.

* * * * *